W. J. FORSHEE.
Cultivator.
No. 18,330.
Patented Oct. 6, 1857.
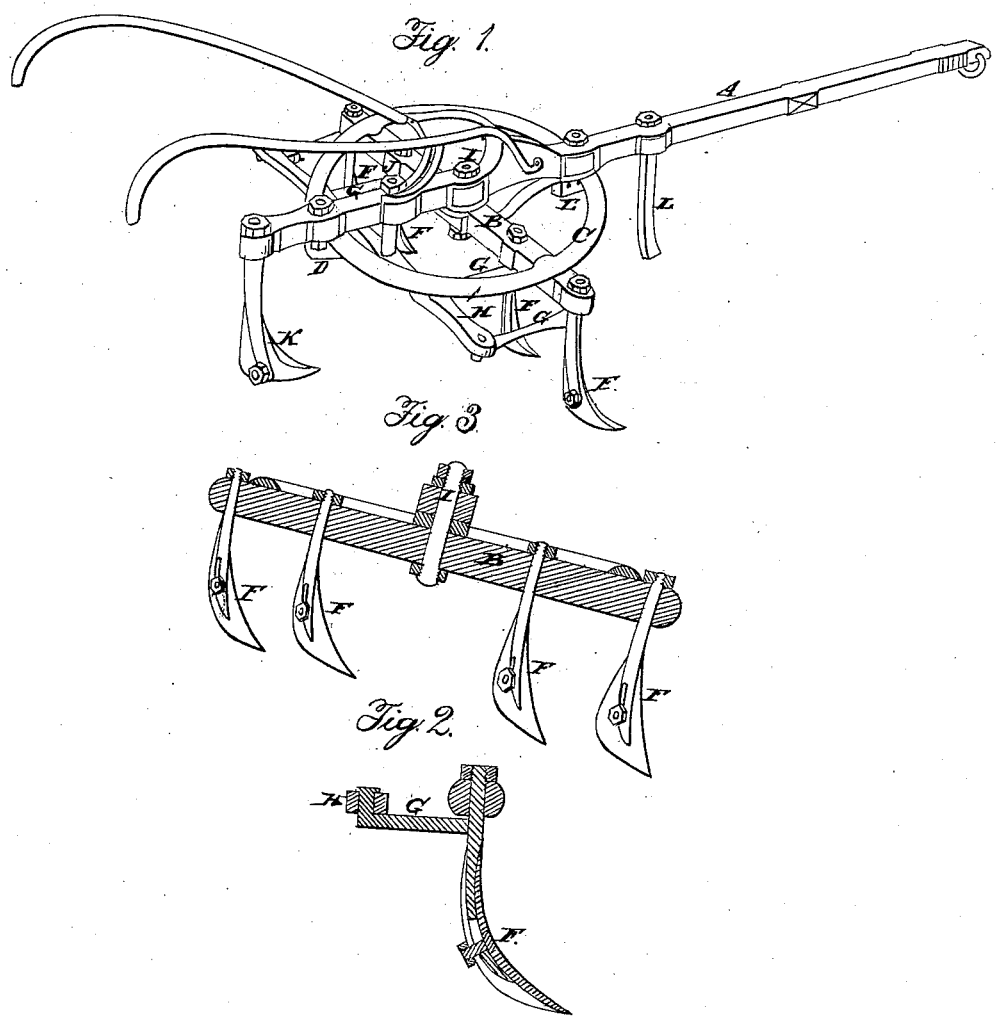

UNITED STATES PATENT OFFICE.

WILLIAM J. FORSHEE, OF INDIANAPOLIS, INDIANA.

IMPROVEMENT IN CULTIVATORS.

Specification forming part of Letters Patent No. 18,330, dated October 6, 1857.

*To all whom it may concern:*

Be it known that I, WM. J. FORSHEE, of Indianapolis, in the county of Marion and State of Indiana, have invented a new and useful Improvement in Cultivators; and I do hereby declare that the following is a full, clear, and exact description of the construction and operation of the same, reference being had to the annexed drawings, making a part of this specification, in which—

Figure 1 is a perspective view, showing its general arrangement; Fig. 2, a sectional view of a cultivator-tooth with its attachment; Fig. 3, a section showing the bar to which the teeth or plows are attached.

A is the beam, to which is attached the bar B, to which is firmly attached the wheel C.

D and E are clamps designed to hold the wheel C in any required position. The teeth F F F and F are attached to shanks, to which are attached the levers G G G and G.

I is a bolt upon which the bar B works or turns.

J is a bolt upon which the bar H turns.

K is a stationary tooth attached to the rear end of the beam A.

L is a cutter attached to the beam in front of the wheel C.

The teeth F F F and F are adjustable to any required angle, still pointing straight forward and widening or narrowing the strip to be cut by the teeth. This is effected by turning the wheel C and bar B, in which the shanks upon which the plows F F F and F are attached work, the levers G G G and G being attached to the bar H at an equal distance from its center, with the attachments of the shanks (upon which are the teeth F F F and F) to the bar B from its center, the levers G G G and G being of equal length. Thus the bars B and H are kept parallel, and the levers G G G and G are kept parallel with each other and parallel with the beam A, upon which the centers of the bars H and B turn.

The teeth are bolted onto the shanks through a slot in the shank, allowing the tooth to be slid down as it wears. When worn too much for use the tooth (being constructed alike at each end) is reversed and the top used for a point, saving the expense of new teeth.

What I claim as my invention, and desire to secure by Letters Patent, is—

The combination and arrangement of the bar B, the wheel C, the bar H, and levers G G G and G, when constructed and operated substantially as set forth.

WILLIAM J. FORSHEE.

Witnesses:
S. A. CALLY,
A. A. LANDRE.